United States Patent
Li et al.

(10) Patent No.: US 10,216,033 B1
(45) Date of Patent: Feb. 26, 2019

(54) COLOR FILTER SUBSTRATE, METHOD FOR FABRICATING THE SAME, AND LIQUID CRYSTAL DISPLAY PANEL

(71) Applicants: BOE Technology Group Co., Ltd., Beijing (CN); Beijing BOE Display Technology Co., Ltd., Beijing (CN)

(72) Inventors: Yanqiu Li, Beijing (CN); Hetao Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/922,540

(22) Filed: Mar. 15, 2018

(30) Foreign Application Priority Data

Aug. 4, 2017 (CN) .......................... 2017 1 0662421

(51) Int. Cl.
*G02F 1/1335* (2006.01)
*G02B 6/12* (2006.01)
*G02B 5/20* (2006.01)

(52) U.S. Cl.
CPC ....... *G02F 1/133516* (2013.01); *G02B 5/201* (2013.01); *G02B 6/12009* (2013.01)

(58) Field of Classification Search
CPC ......... G02F 1/133615; G02F 1/133524; G02F 1/1323; G02B 6/0013
See application file for complete search history.

(56) References Cited

U.S. PATENT DOCUMENTS

2010/0091225 A1\* 4/2010 Cho ........................ G02B 1/005
349/105

\* cited by examiner

*Primary Examiner* — Phu Vu
(74) *Attorney, Agent, or Firm* — McAndrews, Held & Malloy, Ltd.

(57) ABSTRACT

The disclosure discloses a color filter substrate, a method for fabricating the same, and a liquid crystal display panel, the color filter substrate includes: a base substrate; a photonic crystal layer formed on a side of the base substrate, wherein color resistance areas corresponding to sub-pixel elements in a one-to-one manner are arranged at the photonic crystal layer and color resistance areas in different colors are arranged alternately; an arrayed waveguide grating layer arranged on a side of the photonic crystal layer facing away from the base substrate, wherein there are different angles of gratings at the arrayed waveguide grating layer to control output light rays to be irradiated onto different color resistance areas of the photonic crystal layer at different incident angles; and a wave separating layer formed on a side of the arrayed waveguide grating layer facing away from the base substrate.

16 Claims, 7 Drawing Sheets

| θ (degree) | 0 | 5 | 10 | 15 | 20 | 25 | 30 | 35 | 40 |
|---|---|---|---|---|---|---|---|---|---|
| Δλ (nm) | 202 | 202 | 204 | 206 | 207 | 210 | 213 | 216 | 220 |
| θ (degree) | 45 | 50 | 55 | 60 | 65 | 70 | 75 | 80 | 85 |
| Δλ (nm) | 224 | 227 | 232 | 237 | 240 | 243 | 246 | 248 | 249 |

| θ (degree) | 0 | 5 | 10 | 15 | 20 | 25 | 30 | 35 | 40 |
|---|---|---|---|---|---|---|---|---|---|
| Δλ (nm) | 202 | 202 | 199 | 195 | 189 | 182 | 174 | 163 | 152 |
| θ (degree) | 45 | 50 | 55 | 60 | 65 | 70 | 75 | 80 | 85 |
| Δλ (nm) | 139 | 126 | 112 | 98 | 83 | 56 | 47 | 27 | 0 |

COLOR FILTER SUBSTRATE, METHOD FOR FABRICATING THE SAME, AND LIQUID CRYSTAL DISPLAY PANEL

CROSS-REFERENCE TO RELATED APPLICATION

This Application claims priority to Chinese Patent Application No. 201710662421.4, filed on Aug. 4, 2017, the content of which is incorporated by reference in the entirety.

TECHNICAL FIELD

The present disclosure relates to the field of display devices, and particularly to a color filter substrate, a method for fabricating the same, and a liquid crystal display panel.

DESCRIPTION OF THE RELATED ART

As the display technologies are advancing constantly, a Liquid Crystal Display (LCD) has become predominant in the field of flat panel displays. In the related art, a backlight source in the liquid crystal display emits white light which is filtered by color filter components in three colors, and separated into three colors of Red, Green, and Blue.

However, since the white light is synthesized by light in different colors and in a number of different frequency bands, and after it is filtered by the color filter components, the majority thereof is absorbed by those components so that light in only one of the colors can be transmitted through them, thus resulting in a problem in the related art of low transmittance in the liquid crystal panel.

SUMMARY

The disclosure provides a color filter substrate, a method for fabricating the same, and a liquid crystal display panel.

In an aspect, an embodiment of the disclosure provides a color filter substrate including: a base substrate; a photonic crystal layer formed on a side of the base substrate, wherein color resistance areas corresponding to sub-pixel elements in a one-to-one manner are arranged at the photonic crystal layer, and color resistance areas in different colors are arranged alternately so that there is a one-dimensional complex-periodic photonic crystal structure of the photonic crystal layer; an arrayed waveguide grating layer arranged on a side of the photonic crystal layer facing away from the base substrate, wherein there are different angles of gratings at the arrayed waveguide grating layer to control output light rays to be irradiated onto different color resistance areas of the photonic crystal layer at different incident angles; and a wave separating layer formed on a side of the arrayed waveguide grating layer facing away from the base substrate.

In some embodiments, the photonic crystal layer includes thin film mediums of different dielectric materials stacked in sequence in a direction from the base substrate to the arrayed waveguide grating layer.

In some embodiments, the photonic crystal layer includes a first thin film medium and a second thin film medium, which are two thin film mediums of different dielectric constants.

In some embodiments, the photonic crystal layer has a periodicity d=a+b, wherein a is a thickness of the first thin film medium, b is a thickness of the second thin film medium.

In some embodiments, the first thin film medium is lead telluride, and the second thin film medium is magnesium fluoride.

In some embodiments, a grating equation of the arrayed waveguide grating layer is: $n_s d \sin\theta_i + n_C \Delta L + n_s d \sin\theta_o = m\lambda$, wherein $\theta_i$ and $\theta_o$ are angles between an input waveguide, an output waveguide and a central arrayed waveguide respectively, d is a spacing between arrayed waveguides, $n_s$ and $n_C$ are effective refractive indexes of a planar waveguide and a channel waveguide respectively, m is a diffractive order of a grating, and $\lambda$ is a wavelength of a light signal.

In another aspect, an embodiment of the disclosure further provides a liquid crystal display panel including an array substrate, a liquid crystal layer arranged on a side of the array substrate, and a color filter substrate arranged on a side of the liquid crystal layer facing away from the array substrate; wherein the color filter substrate includes: a base substrate; a photonic crystal layer formed on a side of the base substrate, wherein color resistance areas corresponding to sub-pixel elements in a one-to-one manner are arranged at the photonic crystal layer, and color resistance areas in different colors are arranged alternately so that there is a one-dimensional complex-periodic photonic crystal structure of the photonic crystal layer; an arrayed waveguide grating layer arranged on a side of the photonic crystal layer facing away from the base substrate, wherein there are different angles of gratings at the arrayed waveguide grating layer to control output light rays to be irradiated onto the different color resistance areas of the photonic crystal layer at different incident angles; and a wave separating layer formed on a side of the arrayed waveguide grating layer facing away from the base substrate.

In some embodiments, the photonic crystal layer includes thin film mediums of different dielectric materials stacked in sequence in a direction from the base substrate to the arrayed waveguide grating layer.

In some embodiments, the photonic crystal layer includes a first thin film medium and a second thin film medium, which are two thin film mediums of different dielectric constants.

In some embodiments, the photonic crystal layer has a periodicity d=a+b, wherein a is a thickness of the first thin film medium, b is a thickness of the second thin film medium.

In some embodiments, the first thin film medium is lead telluride, and the second thin film medium is magnesium fluoride.

In some embodiments, a grating equation of the arrayed waveguide grating layer is: $n_s d \sin\theta_i + n_C \Delta L + n_s d \sin\theta_o = m\lambda$, wherein $\theta_i$ and $\theta_o$ are angles between an input waveguide, an output waveguide and a central arrayed waveguide respectively, d is a spacing between arrayed waveguides, $n_s$ and $n_C$ are effective refractive indexes of a planar waveguide and a channel waveguide respectively, m is a diffractive order of a grating, and $\lambda$ is a wavelength of a light signal.

In some embodiments, the liquid crystal display panel further includes a reflective film arranged on a side of the array substrate facing the liquid crystal layer to unilaterally reflect light rays from a direction of the color filter substrate, and light rays from a direction of the array substrate can be transmitted through the reflective film.

In still another aspect, an embodiment of the disclosure further provides a method for fabricating the color filter substrate according to the embodiment of the disclosure above, the method including: forming the photonic crystal layer on the base substrate, wherein the color resistance areas corresponding to the sub-pixel elements in a one-toone manner are arranged at the photonic crystal layer, and the color resistance areas in different colors are arranged alternately so that there is a one-dimensional complex-periodic photonic crystal structure of the photonic crystal layer; forming the arrayed waveguide grating layer on the photonic crystal layer, wherein there are different angles of the gratings at the arrayed waveguide grating layer to control output light rays to be irradiated onto different color resistance areas of the photonic crystal layer at different incident angles; and forming the wave separating layer on the arrayed waveguide grating layer.

In some embodiments, forming the arrayed waveguide grating layer includes: forming a silicon dioxide substrate layer on the photonic crystal layer; forming a doped silicon dioxide layer on the silicon dioxide substrate layer, and forming gate patterns via a patterning process; and forming a silicon dioxide overlying layer on the gate patterns.

In some embodiments, the patterning process includes a reactive ion etching process.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

The technical solutions according to the embodiments of the disclosure will be described below clearly and fully with reference to the drawings in the embodiments of the disclosure, and apparently the embodiments to be described below are only a part but not all of the embodiments of the disclosure. Based upon the embodiments here of the disclosure, all the other embodiments which can occur to those ordinarily skilled in the art without any inventive effort shall fall into the scope of the disclosure.

Figure 1:
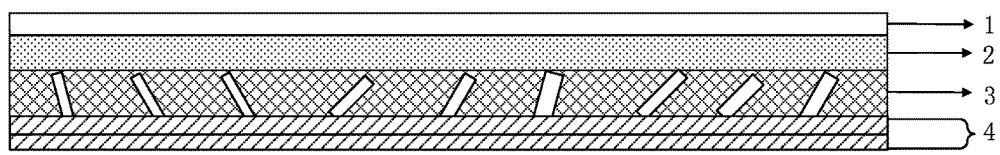
FIG. 1 is a schematic structural diagram of a color filter substrate according to an embodiment of the disclosure.

As illustrated in FIG. 1, embodiments of the disclosure provide a color filter substrate including: a base substrate 1; a photonic crystal layer 2 formed on a side of the base substrate 1, where color resistance areas corresponding to sub-pixel elements in a one-to-one manner are arranged at the photonic crystal layer 2, and color resistance areas in different colors are arranged alternately so that there is a one-dimensional complex-periodic photonic crystal structure of the photonic crystal layer 2; an arrayed waveguide grating layer 3 arranged on a side of the photonic crystal layer 2 facing away from the base substrate 1, where there are different angles of gratings at the arrayed waveguide grating layer 3 to control output light rays to be irradiated onto different color resistance areas of the photonic crystal layer 2 at different incident angles; and a wave separating layer 4 formed on a side of the arrayed waveguide grating layer 3 facing away from the base substrate 1.

Figure 2:
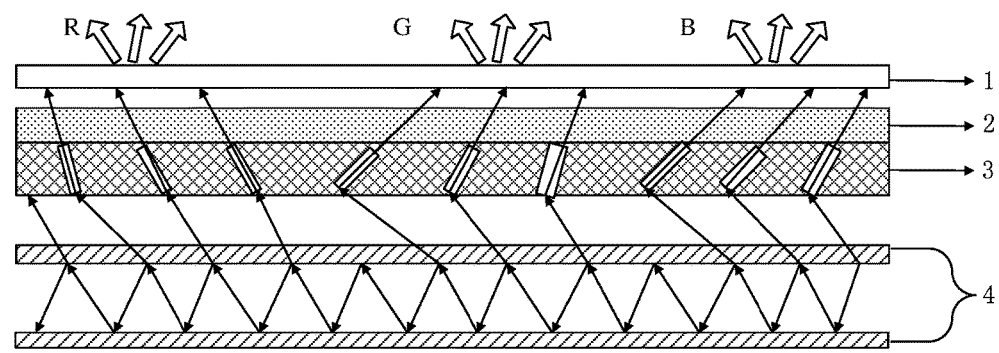
FIG. 2 is a schematic diagram of a propagation path of a light ray in the color filter substrate according to an embodiment of the disclosure.

The color filter substrate according to the embodiments of the disclosure above includes the base substrate 1, the photonic crystal layer 2 formed on the side of the base substrate 1, the arrayed waveguide grating layer 3 arranged on the side of the photonic crystal layer 2 facing away from the base substrate 1, and the wave separating layer 4 formed on the side of the arrayed waveguide grating layer 3 facing away from the base substrate 1. As illustrated in FIG. 2, since there are different angles of the gratings at the arrayed waveguide grating layer 3, the output light rays can be controlled to be irradiated onto different color resistance areas of the photonic crystal layer 2 at different incident angles, and since the color resistance areas arranged at the photonic crystal layer 2 correspond to the sub-pixel elements in a one-to-one manner, a plurality of sub-pixel elements can display normally when a plurality of color resistance areas arranged at the photonic crystal layer 2 render respective colors, so that a display panel to which the color filter substrate is applied can perform a display function.

The color filter substrate according to the embodiments of the disclosure is different from the general structure of the existing color filter substrate in that the color rendering function of the color resistance areas at the photonic crystal layer 2 is achieved by using the arrayed waveguide grating layer 3 including the gratings with different angles. Furthermore there is no additional consumption of light rays being propagated in the modified structure, so that there is an improved transmittance of the color filter substrate according to the embodiments of the disclosure.

Moreover, light in different colors can be transmitted through the color filter substrate according to the embodiments of the disclosure above by controlling different angles of incident light via arrayed waveguide gratings.

In some embodiments, as illustrated in FIG. 2, a plurality of layers of alternating medium films of the wave separating layer 4 constitute a reflector which is a Fabry-Perot resonant cavity. Where the wave separating layer operates under such a principle that: each layer of medium film can both transmit a part and reflect another part of light, the light reflected and transmitted repeatedly at an interface of each layer of medium film is linearly superimposed onto each other as a result of optical interference, and when an optical path of the light reflected and transmitted back and forth between two interfaces of thin films is a wavelength of the light, the repeatedly transmitted light in phase is synthesized into an enhanced transmitted light wave, and the anti-phased repeatedly transmitted light cancels each other. Then light at three wavelengths into which the incident light is separated is transmitted to the arrayed waveguide grating layer 3. Since light rays at different wavelengths can be transmitted through gratings corresponding to color resistance areas in different colors of the photonic crystal layer 2, only light rays corresponding to respective gratings among light rays at the three wavelengths after they are propagated to the arrayed waveguide grating layer 3 can be propagated there to the photonic crystal layer 2, and light rays at the other two wavelengths will still be propagated in the wave separating layer 4 until they arrive at gratings corresponding to their wavelengths. Furthermore since there are different angles of the gratings at the arrayed waveguide grating layer 3, the angle of incident light onto the one-dimensional photonic crystal can be controlled by using the gratings with different angles at the arrayed waveguide grating layer 3 to thereby control the color resistance areas of the photonic crystal layer 2 to render respective colors. Moreover since a light beam in arrayed waveguide gratings is constrained and guided via a waveguide, and the arrayed waveguide grating layer 3 introduces a large optical path difference of light being propagated, thus the gratings can operates at a high order of diffraction to thereby improve the resolution of the gratings.

Furthermore it shall be noted that when the light transmitted through the arrayed waveguide grating layer 3 is incident onto the photonic crystal layer 2, a light wave incident onto the photonic crystal layer 2 may be a TE (transverse electric wave) or a TM (transverse magnetic wave), and a position and a width of a forbidden band vary with a varying incident angle of the light wave, no matter the light wave is the TE or the TM.

In some embodiments, a central wavelength is set to 600 nm, for example.

Figures 3, 4:
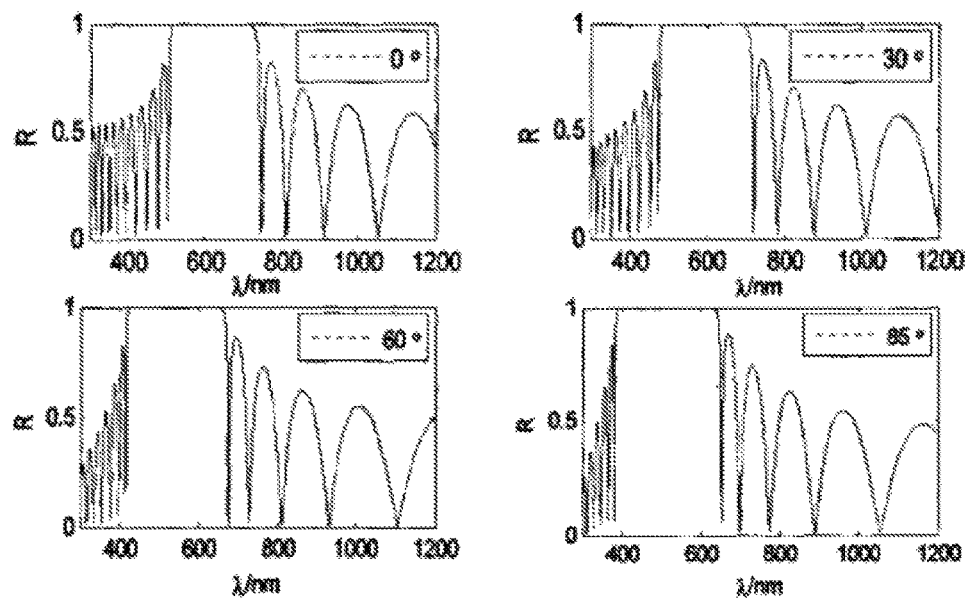
FIG. 3 is a schematic diagram of an influence of an incidence angle of a light ray at a photonic crystal layer upon a forbidden band of photonic crystal, in a TE mode.
FIG. 4 is a schematic diagram of a relationship between the incidence angle of the light ray at the photonic crystal layer, and a width of the forbidden band, in the TE mode.

As illustrated in FIG. 3 and FIG. 4, for an incident light in a TE mode, a position of a forbidden band of the photonic crystal layer 2 moves forward in a shortwave direction at an increasing velocity as an incidence angle is increasing; and a width of the forbidden band of the photonic crystal layer 2 also increases as the incidence angle is increasing, and there is an increasing difference in the width of the forbidden band as the incidence angle is increasing at the same angle interval. For example, when the incidence angle increases from 0 degree to almost grazing incidence, a bandwidth of the photonic crystal increases from 202 nm to 249 nm, and the width of the forbidden band increases by 47 nm.

Figures 5, 6:
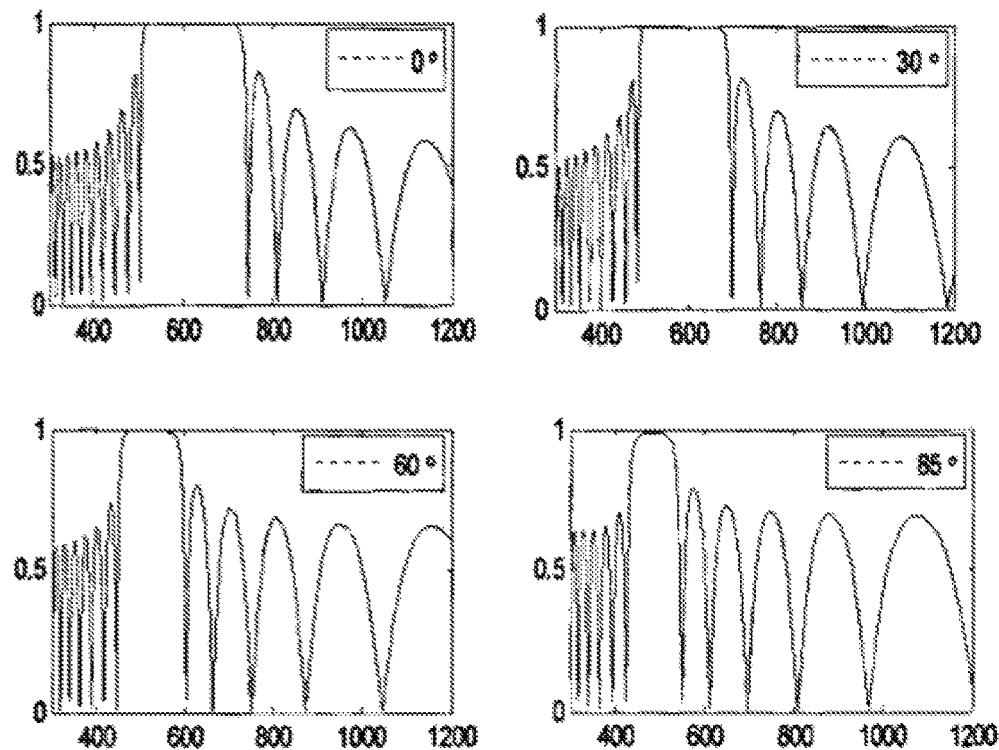
FIG. 5 is a schematic diagram of an influence of the incidence angle of the light ray at the photonic crystal layer upon the forbidden band of the photonic crystal, in a TM mode.
FIG. 6 is a schematic diagram of a relationship between the incidence angle of the light ray at the photonic crystal layer, and the width of the forbidden band, in the TM mode.

As illustrated in FIG. 5 and FIG. 6, for an incident light in a TM mode, the position of the forbidden band of the photonic crystal layer 2 moves forward in the shortwave direction as the incidence angle is increasing, which is substantially the same as the forbidden band varying as the incidence angle of the light is varying in the TE mode. However the width of the forbidden band significantly decreases as the incidence angle is increasing, which is exactly opposite to the width of the forbidden band varying as the incidence angle of the light is varying in the TE mode. An analysis of the bandwidth of the photonic crystal layer 2 varying as the angle of the incident light is varying in the TM mode shows that the width of the forbidden band of the photonic crystal layer 2 insignificantly varies as the incidence angle is varying between 0 and 30 degrees, but the width of the forbidden band varies rapidly after the angle increases to 30 degrees, and there is no forbidden band of the photonic crystal layer 2 after the incidence angle increases to 85 degrees, that is, there is approximately grazing incidence.

An analysis of the relationship between the forbidden band of the photonic crystal layer 2 and the incidence angle shows that a desirable forbidden band can be obtained by adjusting the incidence angle of the light; and also the width of the forbidden band of the photonic crystal layer 2 can be increased as a result of superimposition in the angle domain, so that the incidence angle of the light rays onto the photonic crystal layer 2 can be adjusted according to the position and the width of the forbidden band of the photonic crystal layer 2 for a different material to thereby filter the light.

In some embodiments, the photonic crystal layer 2 includes thin film mediums of different dielectric materials stacked in sequence in a direction from the base substrate 1 to the arrayed waveguide grating layer 3.

It shall be noted that interaction between light and a medium layer can be determined by a characteristic matrix thereof according to a transfer matrix theory, where a characteristic matrix of a single medium layer is defined as:

$$M_i = \begin{bmatrix} \cos\delta_f & -\dfrac{i}{\eta_i}\sin\delta_i \\ -i\eta\sin\delta_i\cos\delta_i \end{bmatrix}$$

$$\delta_i = \frac{2\Pi}{\lambda}\sqrt{n_i h_i}\cos\theta$$

$$\eta_i = \sqrt{\frac{\varepsilon_0}{\mu_0}}\sqrt{\varepsilon_i}\cos(TE)$$

$$\eta_i = \sqrt{\frac{\varepsilon_0}{\mu_0}}\sqrt{\varepsilon_i}\cos(TM).$$

Where $\theta$ and $\lambda$ are an incidence angle and an incidence wavelength respectively, $\varepsilon_i$ is a dielectric constant of the medium layer, $h_i$ is a thickness of the medium layer, $\varepsilon_0$ and $\mu_0$ are a dielectric constant and a magnetic conductivity constant in a vacuum respectively.

When the photonic crystal layer 2 includes n layers of thin film mediums, the characteristic matrix M of the entire photonic crystal layer 2 can be obtained by a product of characteristic matrixes $M_i$ of respective thin film mediums:

$$M = M_1 \cdot M_2 \cdot \ldots M_N = \begin{bmatrix} A & B \\ C & D \end{bmatrix}.$$

Where the reflection coefficient (i.e. the reflectivity) and the transmission coefficient (i.e. the transmittance) of the entire photonic crystal layer 2 can be calculated from M respectively as follows.

$$r = \frac{A\eta_0 + B\eta_0^2 - C - D\eta_0}{A\eta_0 + B\eta_0^2 + C + D\eta_0},$$

and the reflectivity $R = |r|^2$.

$$t = \frac{2\eta_0}{A\eta_0 + B\eta_0^2 + C + D\eta_0},$$

and the transmittance $T=|t|^2$.

Figure 7:
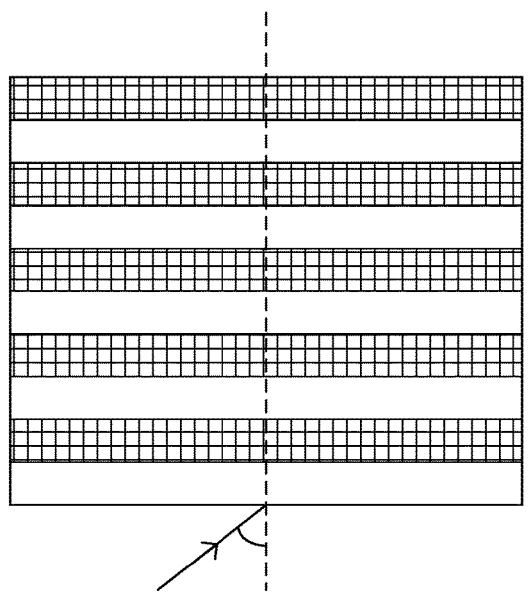
FIG. 7 is a simplified schematic structural diagram of a color filter substrate according to an embodiment of the disclosure in which a photonic crystal layer includes a thin film medium A and a thin film medium B.

In some embodiments, as illustrated in FIG. 7, the photonic crystal layer 2 includes thin film mediums of two different dielectric materials A and B. That is, the photonic crystal layer includes a thin film medium A and a thin film medium B, which are two thin film mediums of different dielectric constants. Where a dielectric constant of the thin film medium A can be represented by $\varepsilon_a$, and a dielectric constant of the thin film medium B can be represented by $\varepsilon_b$.

In some embodiments, the photonic crystal layer 2 has a periodicity d=a+b, where a is a thickness of the thin film medium A, b is a thickness of the thin film medium B.

In some embodiments, the thin film medium A is lead telluride, and the thin film medium B is magnesium fluoride.

In some embodiments, a grating equation of the arrayed waveguide grating layer 3 is: $n_s d \sin \theta_i + n_C \Delta L + n_s d \sin \theta_o = m\lambda$.

Where $\theta_i$ and $\theta_o$ are angles between an input waveguide, an output waveguide and a central arrayed waveguide respectively, d is a spacing between arrayed waveguides, $n_s$ and $n_C$ are effective refractive indexes of a planar waveguide and a channel waveguide respectively, in is a diffractive order of a grating, and $\lambda$ is a wavelength of a light signal.

It shall be noted that the grating equation can be simplified as follows for a central wave input: $n_C \Delta L + n_s d \sin \theta_o = m\lambda$.

There is an additional item of $n_s d \sin \theta_o$ as compared with the traditional grating equation, and there are a higher diffractive order and higher dispersive power due to this item.

Figure 8:
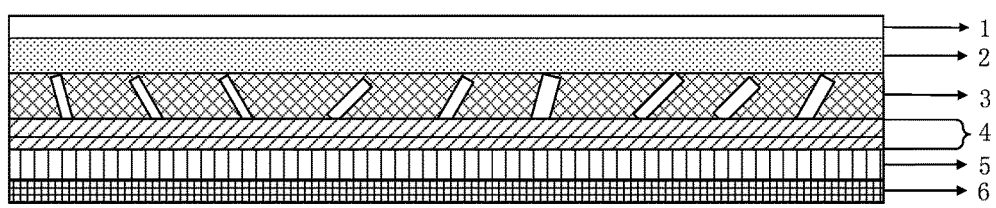
FIG. 8 is a schematic structural diagram of a liquid crystal display panel according to an embodiment of the disclosure.

As illustrated in FIG. 8, embodiments of the disclosure further provide a liquid crystal display panel including an array substrate 6, a liquid crystal layer 5 arranged on a side of the array substrate 6, and the color filter substrate according to any one of the embodiments of the disclosure above, arranged on a side of the liquid crystal layer 5 facing away from the array substrate 6.

Figure 9:
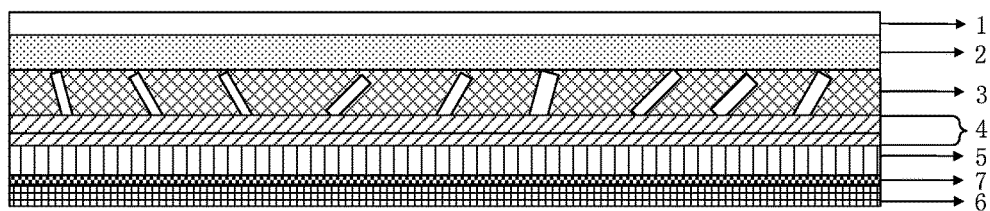
FIG. 9 is a schematic structural diagram of the structure illustrated in FIG. 8 to which a reflective film is added.

In some embodiments, as illustrated in FIG. 9, the liquid crystal display panel further includes a reflective film 7 arranged on a side of the array substrate 6 facing the liquid crystal layer 5 to unilaterally reflect light rays from a direction of the color filter substrate, and light rays from a direction of the array substrate 6 can be transmitted through the reflective film 7.

Figure 10:
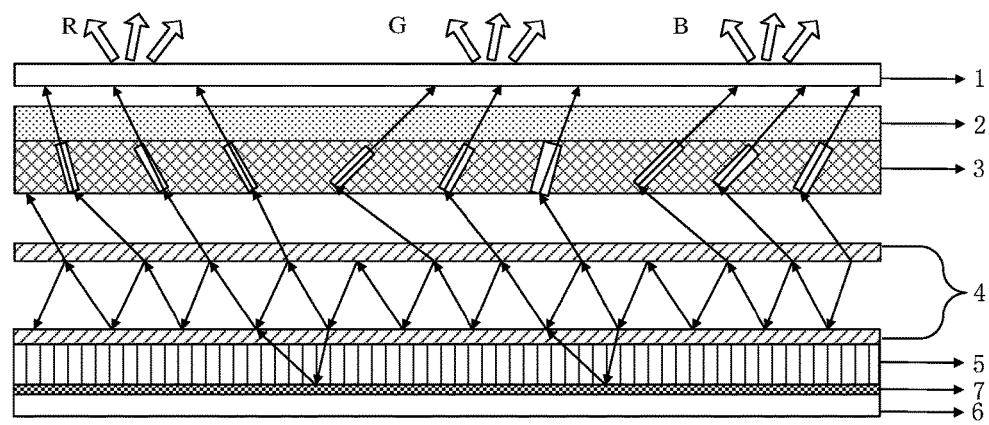
FIG. 10 is a schematic diagram of a propagation path of a light ray in the structure illustrated in FIG. 9.

It shall be noted that as illustrated in FIG. 10, the liquid crystal display panel including the reflective film can be structured to reflect repeatedly the light filtered out by the wave separating layer 4 and the arrayed waveguide grating layer 3 to thereby improve the brightness of the liquid crystal display panel.

Figure 11:
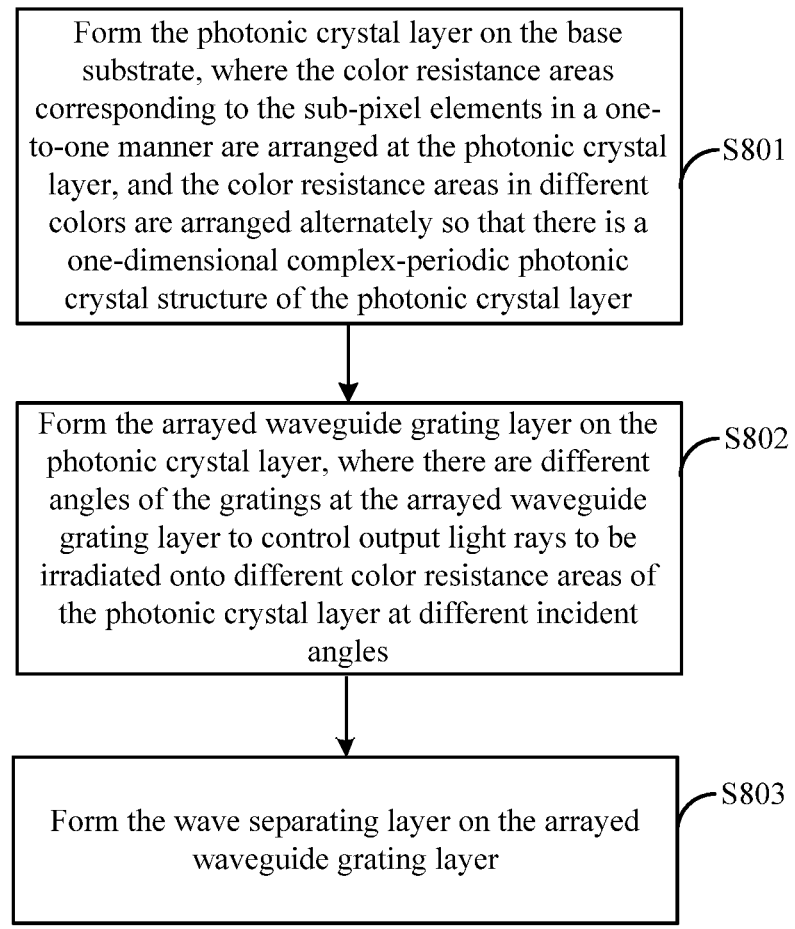
FIG. 11 is a flow block diagram of a method for fabricating a color filter substrate according to an embodiment of the disclosure.

As illustrated in FIG. 11, embodiments of the disclosure further provide a method for fabricating the color filter substrate according to any one of the embodiments of the disclosure above, where the fabricating method includes the following operations.

The operation S101 is to form the photonic crystal layer 2 on the base substrate 1, where the color resistance areas corresponding to the sub-pixel elements in a one-to-one manner are arranged at the photonic crystal layer 2, and the color resistance areas in different colors are arranged alternately so that there is a one-dimensional complex-periodic photonic crystal structure of the photonic crystal layer 2.

The operation S102 is to form the arrayed waveguide grating layer 3 on the photonic crystal layer 2, where there are different angles of the gratings at the arrayed waveguide grating layer 3 to control output light rays to be irradiated onto different color resistance areas of the photonic crystal layer 2 at different incident angles.

The operation S103 is to form the wave separating layer 4 on the arrayed waveguide grating layer 3.

In some embodiments, forming the arrayed waveguide grating layer 3 includes following operations.

Figure 12A:
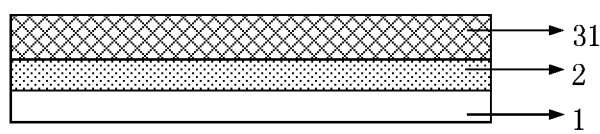
FIG. 12A to FIG. 12D are schematic diagrams of changes on respective layers in a process of fabricating an arrayed waveguide grating layer according to an embodiment of the disclosure.

Forming a silicon dioxide substrate layer 31 on the photonic crystal layer 2 as illustrated in FIG. 12A.

Figure 12B:
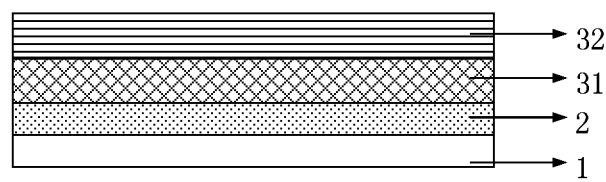
Figure 12C:
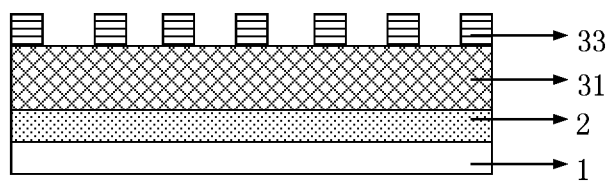

Forming a doped silicon dioxide layer 32 on the silicon dioxide substrate layer 31, and forming gate patterns 33 via a patterning process, as illustrated in FIG. 12B and FIG. 12C.

Figure 12D:
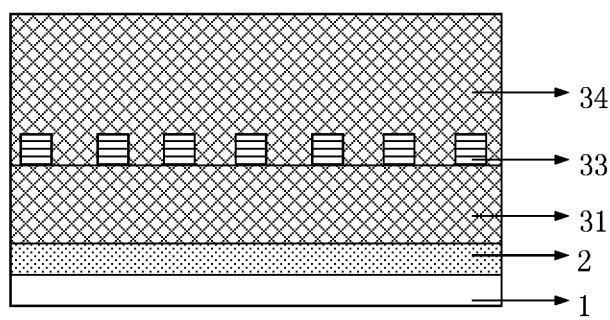

Forming a silicon dioxide overlying layer 34 on the gate patterns 33 as illustrated in FIG. 12D.

It shall be noted that the refractive index of the entire arrayed waveguide grating layer 3 can be improved due to the doped silicon dioxide layer 32.

In some embodiments, the patterning process includes a reactive ion etching process.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A color filter substrate, comprising:
   a base substrate;
   a photonic crystal layer formed on a side of the base substrate, wherein color resistance areas corresponding to sub-pixel elements in a one-to-one manner are arranged at the photonic crystal layer, and color resistance areas in different colors are arranged alternately so that there is a one-dimensional complex-periodic photonic crystal structure of the photonic crystal layer;
   an arrayed waveguide grating layer arranged on a side of the photonic crystal layer facing away from the base substrate, wherein there are different angles of gratings at the arrayed waveguide grating layer to control output light rays to be irradiated onto different color resistance areas of the photonic crystal layer at different incident angles; and
   a wave separating layer formed on a side of the arrayed waveguide grating layer facing away from the base substrate.

2. The color filter substrate according to claim 1, wherein the photonic crystal layer comprises thin film mediums of different dielectric materials stacked in sequence in a direction from the base substrate to the arrayed waveguide grating layer.

3. The color filter substrate according to claim 2, wherein the photonic crystal layer comprises a first thin film medium and a second thin film medium, which are two thin film mediums of different dielectric constants.

4. The color filter substrate according to claim 3, wherein the photonic crystal layer has a periodicity d=a+b, wherein a is a thickness of the first thin film medium, b is a thickness of the second thin film medium.

5. The color filter substrate according to claim 3, wherein the first thin film medium is lead telluride, and the second thin film medium is magnesium fluoride.

6. The color filter substrate according to claim 1, wherein a grating equation of the arrayed waveguide grating layer is:

$$n_s d \sin \theta_i + n_C \Delta L + n_s d \sin \theta_o = m\lambda;$$

wherein $\theta_i$ and $\theta_o$ are angles between an input waveguide, an output waveguide and a central arrayed waveguide respectively, d is a spacing between arrayed waveguides, $n_s$ and $n_C$ are effective refractive indexes of a planar waveguide and a channel waveguide respectively, m is a diffractive order of a grating, and $\lambda$ is a wavelength of a light signal.

7. A liquid crystal display panel, comprising an array substrate, a liquid crystal layer arranged on a side of the array substrate, and a color filter substrate arranged on a side of the liquid crystal layer facing away from the array substrate, wherein the color filter substrate comprises:
a base substrate;
a photonic crystal layer formed on a side of the base substrate, wherein color resistance areas corresponding to sub-pixel elements in a one-to-one manner are arranged at the photonic crystal layer, and color resistance areas in different colors are arranged alternately so that there is a one-dimensional complex-periodic photonic crystal structure of the photonic crystal layer;
an arrayed waveguide grating layer arranged on a side of the photonic crystal layer facing away from the base substrate, wherein there are different angles of gratings at the arrayed waveguide grating layer to control output light rays to be irradiated onto different color resistance areas of the photonic crystal layer at different incident angles; and
a wave separating layer formed on a side of the arrayed waveguide grating layer facing away from the base substrate.

8. The liquid crystal display panel according to claim 7, wherein the photonic crystal layer comprises thin film mediums of different dielectric materials stacked in sequence in a direction from the base substrate to the arrayed waveguide grating layer.

9. The liquid crystal display panel according to claim 8, wherein the photonic crystal layer comprises a first thin film medium and a second thin film medium, which are two thin film mediums of different dielectric constants.

10. The liquid crystal display panel according to claim 9, wherein the photonic crystal layer has a periodicity d=a+b, wherein a is a thickness of the first thin film medium, b is a thickness of the second thin film medium.

11. The liquid crystal display panel according to claim 9, wherein the first thin film medium is lead telluride, and the second thin film medium is magnesium fluoride.

12. The liquid crystal display panel according to claim 7, wherein a grating equation of the arrayed waveguide grating layer is:

$$n_s d \sin \theta_i + n_C \Delta L + n_s d \sin \theta_o = m\lambda;$$

wherein $\theta_i$ and $\theta_o$ are angles between an input waveguide, an output waveguide and a central arrayed waveguide respectively, d is a spacing between arrayed waveguides, $n_s$ and $n_C$ are effective refractive indexes of a planar waveguide and a channel waveguide respectively, m is a diffractive order of a grating, and $\lambda$ is a wavelength of a light signal.

13. The liquid crystal display panel according to claim 7, wherein the liquid crystal display panel further comprises a reflective film arranged on a side of the array substrate facing the liquid crystal layer to unilaterally reflect light rays from a direction of the color filter substrate, and light rays from a direction of the array substrate can be transmitted through the reflective film.

14. A method for fabricating the color filter substrate according to claim 1, the method comprising:
forming the photonic crystal layer on the base substrate, where the color resistance areas corresponding to the sub-pixel elements in a one-to-one manner are arranged at the photonic crystal layer, and the color resistance areas in different colors are arranged alternately so that there is a one-dimensional complex-periodic photonic crystal structure of the photonic crystal layer;
forming the arrayed waveguide grating layer on the photonic crystal layer, where there are different angles of the gratings at the arrayed waveguide grating layer to control output light rays to be irradiated onto different color resistance areas of the photonic crystal layer at different incident angles; and
forming the wave separating layer on the arrayed waveguide grating layer.

15. The method according to claim 14, wherein forming the arrayed waveguide grating layer comprises:
forming a silicon dioxide substrate layer on the photonic crystal layer;
forming a doped silicon dioxide layer on the silicon dioxide substrate layer, and forming gate patterns via a patterning process; and
forming a silicon dioxide overlying layer on the gate patterns.

16. The method according to claim 15, wherein the patterning process comprises a reactive ion etching process.

* * * * *